United States Patent
Rottiers et al.

(10) Patent No.: US 11,767,908 B2
(45) Date of Patent: Sep. 26, 2023

(54) LUBRICANT TRANSFER RING HAVING A PLURALITY OF CHAMBERS

(71) Applicants: ZF Friedrichshafen AG, Friedrichshafen (DE); ZF Wind Power Antwerpen N.V., Lommel (BE)

(72) Inventors: Stijn Rottiers, Lokeren (BE); Wim De Laet, Antwerp (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 379 days.

(21) Appl. No.: 17/291,288

(22) PCT Filed: Oct. 7, 2019

(86) PCT No.: PCT/EP2019/077009
§ 371 (c)(1),
(2) Date: May 5, 2021

(87) PCT Pub. No.: WO2020/094306
PCT Pub. Date: May 14, 2020

(65) Prior Publication Data
US 2022/0003305 A1  Jan. 6, 2022

(30) Foreign Application Priority Data
Nov. 7, 2018 (DE) ..................... 10 2018 218 976.5

(51) Int. Cl.
*F16H 57/04* (2010.01)

(52) U.S. Cl.
CPC ....... *F16H 57/043* (2013.01); *F16H 57/0409* (2013.01); *F16H 57/0479* (2013.01)

(58) Field of Classification Search
CPC . F16H 57/043; F16H 57/0409; F16H 57/0479
See application file for complete search history.

(56) References Cited

U.S. PATENT DOCUMENTS

| 7,214,157 B2 * | 5/2007 | Flamang | F16H 57/0479 184/6.12 |
| 10,281,044 B2 * | 5/2019 | Leimann | F16N 21/00 |

(Continued)

FOREIGN PATENT DOCUMENTS

| DE | 19916106 A1 | 10/2000 |
| DE | 10260132 A1 | 7/2004 |

(Continued)

*Primary Examiner* — Michael A Riegelman
(74) *Attorney, Agent, or Firm* — LEYDIG, VOIT & MAYER, LTD.

(57) ABSTRACT

An arrangement includes a first component having a first groove and a second groove. The arrangement further includes a second component and a fluid transfer ring fixed to the second component. The fluid transfer ring engages with a first wall and a second wall in the first groove such that the fluid transfer ring and the first groove form a first cavity. The first component and the second component are rotatable relative to each other. The fluid transfer ring further engages with a third wall in the second groove such that the fluid transfer ring and the second groove form a second cavity.

4 Claims, 1 Drawing Sheet

(56) References Cited

U.S. PATENT DOCUMENTS

| | | | |
|---|---|---|---|
| 2005/0051387 A1* | 3/2005 | Flamang | F16H 57/043 |
| | | | 184/6.12 |
| 2016/0265651 A1* | 9/2016 | Smook | F03D 80/70 |
| 2016/0334004 A1* | 11/2016 | Leimann | F16N 21/00 |
| 2021/0079996 A1* | 3/2021 | Hetmaniok | F16H 57/0482 |
| 2022/0003305 A1* | 1/2022 | Rottiers | F16J 15/002 |
| 2022/0010875 A1* | 1/2022 | De Laet | F16H 57/082 |
| 2023/0014947 A1* | 1/2023 | De Laet | H02K 7/183 |

FOREIGN PATENT DOCUMENTS

| | | |
|---|---|---|
| DE | 102013222847 A1 | 5/2015 |
| DE | 102014200863 A1 | 7/2015 |
| DE | 102015223092 A1 | 5/2017 |
| EP | 1488139 B1 | 8/2006 |
| EP | 2527694 A1 | 11/2012 |
| WO | WO 2015106901 A1 | 7/2015 |

* cited by examiner

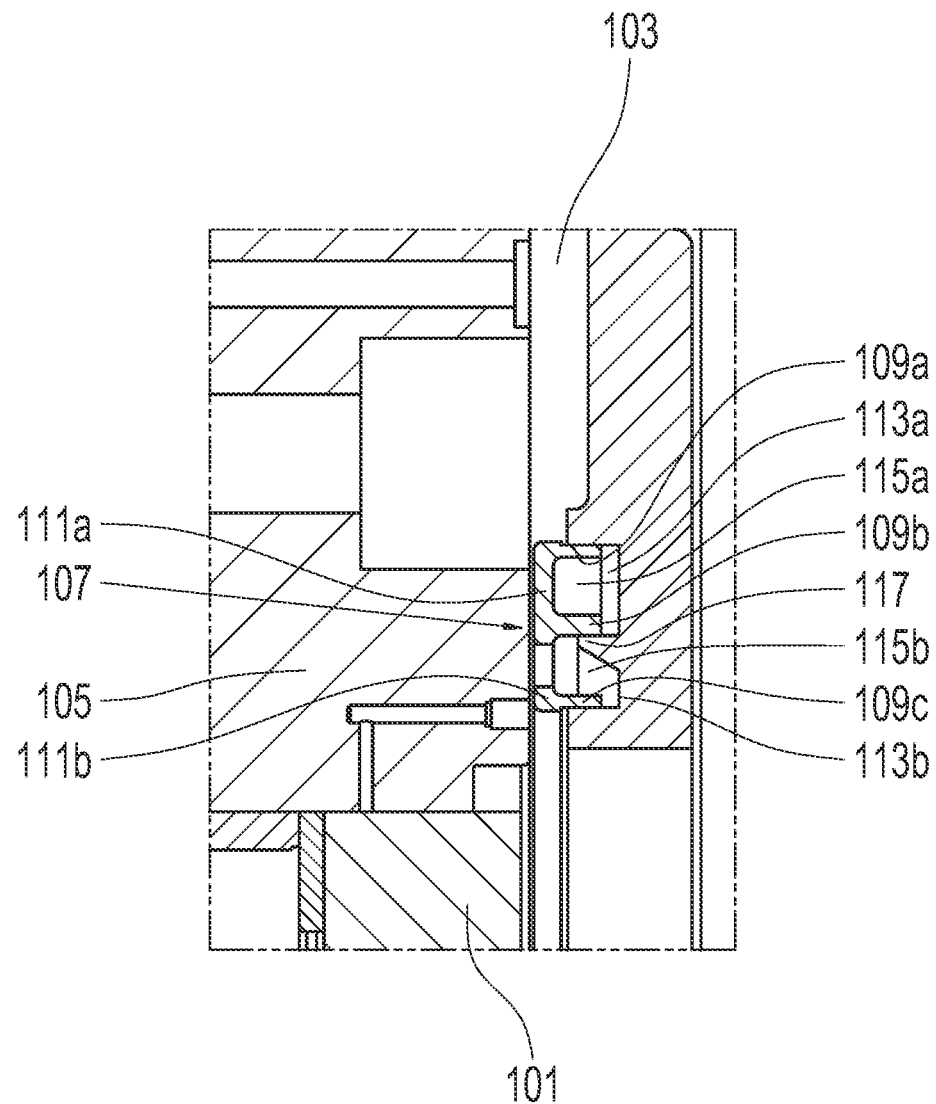

LUBRICANT TRANSFER RING HAVING A PLURALITY OF CHAMBERS

CROSS-REFERENCE TO PRIOR APPLICATIONS

This application is a U.S. National Phase Application under 35 U.S.C. § 371 of International Application No. PCT/EP2019/077009, filed on Oct. 7, 2019, and claims benefit to German Patent Application No. DE 10 2018 218 976.5, filed on Nov. 7, 2018. The International Application was published in German on May 14, 2020 as WO 2020/094306 under PCT Article 21(2).

FIELD

The disclosure relates to an arrangement including a first component and a second component, which are rotatable relative to each other, and a fluid transfer ring fixed to the second component.

BACKGROUND

The publication EP 1 488 139 A1 discloses a ring for transferring lubricant between a transmission housing and a rotatably mounted planet carrier. The ring is fixed to the planet carrier. It engages in a groove in the transmission housing to create a lubricant-conducting cavity.

SUMMARY

In an embodiment, the present invention provides an arrangement including a first component having a first groove and a second groove. The arrangement further includes a second component and a fluid transfer ring fixed to the second component. The fluid transfer ring engages with a first wall and a second wall in the first groove such that the fluid transfer ring and the first groove form a first cavity. The first component and the second component are rotatable relative to each other. The fluid transfer ring further engages with a third wall in the second groove such that the fluid transfer ring and the second groove form a second cavity.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

The FIGURE shows a section of a planetary stage with fluid transfer ring.

DETAILED DESCRIPTION

The present disclosure provides an arrangement for improving the transfer of fluid between a plurality of fluid lines of two components that can be rotated relative to one another. In this case, the leakage and friction losses that occur should be reduced.

The arrangement comprises a first component and a second component that are rotatable relative to one another. These are preferably components of a transmission, such as a rotatably mounted planet carrier and a structure that is fixed to the housing.

The arrangement also has a fluid transfer ring. A fluid transfer ring designates a means for transferring fluid between the first component and the second component, in other words from the first component to the second component and/or from the second component to the first component. The fluid can in particular be oil.

The first component has a first groove. The fluid transfer ring is fixed to the second component at least non-rotationally, preferably rigidly—in other words, without the possibility of relative movement—and engages with a first wall and a second wall in the first groove. At least a part of the first wall thus runs within the first groove. Likewise, at least a part of the second wall runs within the first groove. The fluid transfer ring thereby forms a first cavity with the first groove. The first cavity establishes a first lubricant-conducting connection between the first component and the second component.

Since the first component and the second component are rotatable relative to each other, the first wall, the second wall and the groove must be rotationally symmetrical about an axis of rotation of a relative rotation of the first component and the second component.

The first component has a second groove. The fluid transfer ring engages with a third wall in the second groove. At least a portion of the third wall runs within the second groove. This creates a second cavity. The fluid transfer ring thus forms the second cavity with the second groove. The second cavity establishes a second fluid-conducting connection between the first component and the second component.

The fluid transfer ring only engages with the third wall in the second groove. A fourth wall is not provided.

A web extends between the first groove and the second groove. Said web engages in a space between the second wall and the third wall. At least a part of the web is thus located in said space.

The first cavity and the second cavity are separated from each other by the second wall and the web. The second wall and the web are therefore involved in the formation not only of the first cavity but also of the second cavity.

The second groove and the third wall are also rotationally symmetrical with respect to the axis of rotation of the first component and of the second component.

A narrow gap preferably in each case extends between the first wall and the first groove, between the second wall and the first groove, and between the third wall and the second groove. This is so narrow that a leakage loss through the gap will be minimal and thus a pressure build-up necessary for the transmission of fluid will occur in the cavities. The gaps prevent the fluid transfer ring and the first component from touching each other. The fluid transfer ring is thus wear-free. In addition, it is possible to use a hard material, such as metal, for the fluid transfer ring.

One advantage results from the fact that fluid can escape only through the gap running between the first wall and the first groove and through the gap running between the third wall and the second groove. The gap running between the second wall and the first groove permits leakage only between the two cavities. Leakage losses are thus reduced.

Alternatively, it is possible to design the arrangement free of gaps. In this case, the three walls of the fluid transfer ring each form a seal. The seal of the first wall and the seal of the second wall bear against the first groove; the seal of the third wall bears against the second groove. Leakages are thereby largely prevented. However, friction does occur due to the seals. The seal reduces friction, since compared to the prior art, the arrangement makes it possible to reduce the number of seals from four to three.

The fluid transfer ring and the grooves can be arranged axially or radially offset from one another with respect to the aforementioned axis of rotation. In the case of an axial offset, the grooves are open in the axial direction, with a radial offset correspondingly in the radial direction.

In a preferred development, the first component has a first fluid line and a second fluid line, while the second component has a third fluid line and a fourth fluid line. The first fluid line and the third fluid line open into the first cavity. The second fluid line and the fourth fluid line open into the second cavity. The first cavity thereby fluidically connects the first fluid line and the third fluid line to each other. Correspondingly, the second cavity fluidically connects the second fluid line and the fourth fluid line to each other.

The fluid transfer ring is preferably developed in one piece.

A first part of the fluid ring comprises the first wall and the second wall. A second part comprises the second wall and the third wall. The first part and the second part thus overlap in the second wall. According to the development the first part and the second part, each have a U-shaped profile. This means that the first part and the second part are U-shaped in the longitudinal section, that is to say in a section that completely covers the aforementioned rotational axis. The longitudinal section gives rise to an image of two Us, which have one common leg. The common leg is the longitudinal section of the second wall. The remaining legs are formed by the cross-section of the first wall and the third wall.

The FIGURE shows a planet carrier 101, which is rotatably mounted in a transmission housing 103. A planetary pin 105 is fixed in the planet carrier 101.

A transfer ring 107 is provided for transferring transmission oil from the fixed transmission housing 103 to the rotatable planet carrier 101. It comprises a first wall 109a, a second wall 109b and a third wall 109c. The three walls 109a, 109b, 109c extend in the axial direction. The second wall 109b is located radially between the first wall 109a and the third wall 109c. A first annular segment 111a connects the first wall 109a to the second wall 109b. Correspondingly, a second annular segment 111b connects the second wall 109b to the third wall 109c. In the annular segments 111a, 111b, the transfer ring 107 is fixed to the planet carrier 101.

The housing 103 has a first groove 113a and a second groove 113b, which are open in the direction of the transfer ring 107. With the first wall 109a and the second wall 109b, the transfer ring 107 engages in the first groove 113a. The transfer ring 107 and the first groove 113a thereby form a first cavity 115a. In detail, the first cavity 115a is formed by the first wall 109a, the second wall 109c, the first annular segment 111a and the first groove 113a.

With the third wall 109c, the transfer ring 107 engages in the second groove 113b to form a second cavity 115b. Since the first groove 113a and the second groove 113b are arranged immediately adjacent and separated from each other only by a narrow web 117, the second wall 109a together with the third wall 109c, the second annular segment 111b and the second groove 113b form a second cavity 115b.

In each case, a lubricant line formed by the transmission housing 103 and a lubricant line formed by the planet carrier 101 and the planet pin 105 open into the first cavity 115a and into the second cavity 115b. Such lubricant lines are connected to one another in a lubricant-conducting manner by the respective cavity 115a, 115b. This allows lubricant to be transferred from the fixed transmission housing 103 to the rotating planet carrier 101.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An arrangement comprising:
a first component including a first groove and a second groove;
a second component; and
a fluid transfer ring fixed to the second component and engaging with a first wall and a second wall in the first groove such that the fluid transfer ring and the first groove form a first cavity,
wherein the first component and the second component are rotatable relative to each other, and
wherein the fluid transfer ring further engages with a third wall in the second groove such that the fluid transfer ring and the second groove form a second cavity.

2. The arrangement according to claim 1, wherein the first component further includes a first fluid line and a second fluid line;
wherein the second component comprises a third fluid line and a fourth fluid line,
wherein the first fluid line and the third fluid line open into the first cavity, and
wherein the second fluid line and the fourth fluid line open into the second cavity.

3. The arrangement according to claim 1, wherein the fluid transfer ring is of one-piece construction.

4. The arrangement according to claim 1, wherein a first part of the fluid transfer ring comprising the first wall and the second wall and a second part of the fluid transfer ring comprising the second wall and the third wall each have a U-shaped profile.

* * * * *